(12) United States Patent
Zednicek et al.

(10) Patent No.: US 8,279,583 B2
(45) Date of Patent: Oct. 2, 2012

(54) ANODE FOR AN ELECTROLYTIC CAPACITOR THAT CONTAINS INDIVIDUAL COMPONENTS CONNECTED BY A REFRACTORY METAL PASTE

(75) Inventors: Stanislav Zednicek, Lanskroun (CZ); Peter Jacisko, Lanskroun (CZ); Tomas Karnik, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 390 days.

(21) Appl. No.: 12/474,303

(22) Filed: May 29, 2009

(65) Prior Publication Data

US 2010/0302710 A1   Dec. 2, 2010

(51) Int. Cl.
*H01G 9/04* (2006.01)
*H01G 9/145* (2006.01)
*H01G 2/10* (2006.01)

(52) U.S. Cl. ........................................ 361/528; 361/535
(58) Field of Classification Search .................. 361/523, 361/528, 532, 535
See application file for complete search history.

(56) References Cited

U.S. PATENT DOCUMENTS

| | | | |
|---|---|---|---|
| 2,756,485 A | 7/1956 | Abramson et al. | |
| 2,936,514 A | 5/1960 | Millard | |
| 3,345,545 A * | 10/1967 | Bourgault et al. | 361/529 |
| 3,588,628 A | 6/1971 | Beck | |
| 3,781,976 A | 1/1974 | Tomiwa | |
| 3,789,274 A | 1/1974 | Pfister | |
| 3,818,581 A | 6/1974 | Vartanian et al. | |
| 3,828,227 A | 8/1974 | Millard et al. | |
| 3,997,821 A | 12/1976 | Sternbeck | |
| 4,017,773 A | 4/1977 | Cheseldine | |
| 4,085,435 A | 4/1978 | Galvagni | |
| 4,090,231 A | 5/1978 | Millard et al. | |
| 4,107,762 A | 8/1978 | Shirn et al. | |
| 4,247,883 A | 1/1981 | Thompson et al. | |
| 4,288,842 A | 9/1981 | Voyles | |
| 4,488,204 A | 12/1984 | Beck, Jr. | |
| 4,497,105 A | 2/1985 | Uemura | |
| 4,520,430 A | 5/1985 | Long et al. | |

(Continued)

FOREIGN PATENT DOCUMENTS

GB   2123610 A   2/1984

(Continued)

OTHER PUBLICATIONS

Abstract of Japanese Patent No. JP1227422, Mar. 7, 1988.

(Continued)

*Primary Examiner* — Eric Thomas
(74) *Attorney, Agent, or Firm* — Dority & Manning, P.A.

(57) ABSTRACT

A solid electrolytic capacitor containing a capacitor element that includes an anode, dielectric layer, and solid electrolyte is provided. The anode is formed from a plurality (e.g., two or more) of separate components, which allows the properties of each component (e.g., density, quality, etc.) to be more readily controlled during manufacturing. The components are electrically connected using a refractory metal paste (e.g., tantalum paste) that sinter bonds to the components to form a strong and reliable connection. The ability to reliably bond together separate components enables the use of a wide degree of possible cross-sectional profiles for each individual component. For example, the components may posses a relatively complex profile that contains one or more indentations and/or projections for increasing surface area. Despite the complex profile, the components may be readily connected to each other in accordance with the present invention to form the anode.

29 Claims, 6 Drawing Sheets

U.S. PATENT DOCUMENTS

| | | | |
|---|---|---|---|
| 4,571,662 A | 2/1986 | Conquest et al. |
| 4,599,788 A | 7/1986 | Love et al. |
| 4,648,180 A | 3/1987 | Holt |
| 4,675,790 A | 6/1987 | DeMatos et al. |
| 4,945,452 A | 7/1990 | Sturmer et al. |
| 4,972,299 A | 11/1990 | Hagiwara et al. |
| 5,198,968 A | 3/1993 | Galvagni |
| 5,266,622 A | 11/1993 | Mazanek et al. |
| 5,349,496 A | 9/1994 | Taniguchi et al. |
| 5,357,399 A | 10/1994 | Salisbury |
| 5,390,074 A | 2/1995 | Hasegawa et al. |
| 5,394,295 A | 2/1995 | Galvagni et al. |
| 5,457,862 A | 10/1995 | Sakata et al. |
| 5,461,537 A | 10/1995 | Kobayashi et al. |
| 5,473,503 A | 12/1995 | Sakata et al. |
| 5,495,386 A | 2/1996 | Kukkarni |
| 5,723,535 A | 3/1998 | Krismer et al. |
| 5,729,428 A | 3/1998 | Sakata et al. |
| 5,750,194 A | 5/1998 | Watanabe et al. |
| 5,812,367 A | 9/1998 | Kudoh et al. |
| 5,840,086 A | 11/1998 | Takami et al. |
| 5,949,639 A | 9/1999 | Maeda et al. |
| 6,017,367 A | 1/2000 | Nakata |
| 6,191,936 B1 * | 2/2001 | Webber et al. ............ 361/528 |
| 6,197,252 B1 | 3/2001 | Bishop et al. |
| 6,236,561 B1 | 5/2001 | Ogina et al. |
| 6,262,878 B1 | 7/2001 | Shirashige et al. |
| 6,322,912 B1 | 11/2001 | Fife |
| 6,333,844 B1 | 12/2001 | Nakamura |
| 6,346,127 B1 | 2/2002 | Kuriyama |
| 6,380,577 B1 | 4/2002 | Cadwallader |
| 6,391,275 B1 | 5/2002 | Fife |
| 6,400,556 B1 | 6/2002 | Masuda et al. |
| 6,416,730 B1 | 7/2002 | Fife |
| 6,430,034 B2 | 8/2002 | Sano et al. |
| 6,467,142 B1 | 10/2002 | Shirashige et al. |
| 6,477,030 B2 | 11/2002 | Hadaka et al. |
| 6,519,135 B2 | 2/2003 | Sano et al. |
| 6,527,937 B2 | 3/2003 | Fife |
| 6,576,099 B2 | 6/2003 | Kimmel et al. |
| 6,592,740 B2 | 7/2003 | Fife |
| 6,616,713 B2 | 9/2003 | Sano et al. |
| 6,639,787 B2 | 10/2003 | Kimmel et al. |
| 6,643,121 B1 | 11/2003 | Huntington |
| 6,665,172 B1 | 12/2003 | Kim et al. |
| 6,673,389 B1 | 1/2004 | Huntington |
| 6,674,635 B1 | 1/2004 | Fife et al. |
| 6,680,841 B2 | 1/2004 | Tadanobu et al. |
| 6,699,767 B1 | 3/2004 | Huntington |
| 6,717,793 B2 | 4/2004 | Arai et al. |
| 6,751,085 B1 | 6/2004 | Huntington |
| 6,751,086 B2 | 6/2004 | Matsumoto |
| 6,775,127 B2 | 8/2004 | Yoshida |
| 6,808,541 B2 | 10/2004 | Maeda |
| 6,813,140 B1 | 11/2004 | Huntington |
| 6,849,292 B1 | 2/2005 | Huntington |
| 6,870,727 B2 | 3/2005 | Edson et al. |
| 6,870,728 B1 | 3/2005 | Burket et al. |
| 6,882,521 B2 | 4/2005 | Tsutsui et al. |
| 6,891,717 B2 | 5/2005 | Fujii et al. |
| 6,903,921 B2 | 6/2005 | Ishijima |
| 6,903,922 B2 | 6/2005 | Sano et al. |
| 6,920,037 B2 | 7/2005 | Sano et al. |
| 6,970,345 B2 | 11/2005 | Oh et al. |
| 6,992,880 B2 | 1/2006 | Tadanobu et al. |
| 6,995,972 B2 | 2/2006 | Fujii et al. |
| 7,027,291 B2 | 4/2006 | Horio et al. |
| 7,057,882 B2 | 6/2006 | Fujii et al. |
| 7,116,548 B2 | 10/2006 | Satterfield, Jr. et al. |
| 7,158,368 B2 | 1/2007 | Fujii et al. |
| 7,184,257 B2 | 2/2007 | Kobayashi et al. |
| 7,220,397 B2 | 5/2007 | Kimmel et al. |
| 7,262,511 B2 | 8/2007 | Osako et al. |
| 7,271,995 B2 | 9/2007 | Edson et al. |
| 7,323,395 B2 | 1/2008 | Huntington |
| 7,341,705 B2 | 3/2008 | Schnitter |
| 7,342,775 B2 | 3/2008 | Hahn et al. |
| 7,351,915 B2 | 4/2008 | Ahn et al. |
| 7,381,396 B2 | 6/2008 | Thomas et al. |
| 7,393,771 B2 | 7/2008 | Hozoji et al. |
| 7,419,926 B2 | 9/2008 | Schnitter et al. |
| 7,449,032 B2 | 11/2008 | Vaisman et al. |
| 7,460,358 B2 | 12/2008 | Biler |
| 7,515,396 B2 | 4/2009 | Biler |
| 2003/0070920 A1 | 4/2003 | Shah et al. |
| 2003/0104923 A1 | 6/2003 | Omori et al. |
| 2008/0062617 A1 | 3/2008 | Edson et al. |
| 2008/0106852 A1 | 5/2008 | Amita et al. |
| 2008/0247122 A1 | 10/2008 | Vaisman et al. |

FOREIGN PATENT DOCUMENTS

| | | |
|---|---|---|
| JP | 129050 | 6/1989 |
| JP | 1276613 | 7/1989 |
| JP | 5234828 | 9/1993 |
| JP | H7106204 | 4/1995 |
| JP | H1187175 | 3/1999 |
| JP | 11288844 | 10/1999 |
| JP | 1061537 A2 | 12/2000 |

OTHER PUBLICATIONS

Abstract of Japanese Patent No. JP2087612, Sep. 11, 1989.
Abstract of Japanese Patent No. JP6005478, Jan. 14, 1994.
Abstract of Japanese Patent No. JP7106204, Apr. 21, 1995.
Abstract of Japanese Patent No. JP7240343, Sep. 12, 1995.
Abstract of Japanese Patent No. JP8130166, May 21, 1996.
Abstract of Japanese Patent No. JP2000049048, Feb. 18, 2000.
Abstract of Japanese Patent No. JP2001291641, Oct. 19, 2001.
Abstract of Japanese Patent No. JP2001110676, Apr. 20, 2001.
*Adsorption of Gases in Multimolecular Layers*, Brunauer et al., The Journal of the American Chemical Society, vol. 60, Jan.-Jun. 1938, pp. 309-319.
Product Information on Borcher's Wetting and Dispersing Additives from Borchers GmbH, Apr. 2005, 6 pages.
Related U.S. Patent Applications, 2 pages.

* cited by examiner

US 8,279,583 B2

ANODE FOR AN ELECTROLYTIC CAPACITOR THAT CONTAINS INDIVIDUAL COMPONENTS CONNECTED BY A REFRACTORY METAL PASTE

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a lead wire, sintering the pressed part, anodizing the sintered anode, and thereafter applying a solid electrolyte. During use, current flows through points of contact between the lead wire and small necks of the sintered particles of the porous anode. To reduce the resistance to this current flow, various techniques have been developed for increasing the cross sectional area of the anode. Fluted anodes, for instance, have been developed that have a cross-sectional profile containing indentations that reduce the path length through the internal solid electrolyte and increase the cross-sectional area for current to flow through the external solid electrolyte. Despite the benefits achieved, however, the electrical performance that may be achieved by such fluted anodes is limited due to the difficulty in pressing parts of a highly complex shape. As such, a need for improvement remains.

SUMMARY OF THE INVENTION

In accordance with one embodiment of the present invention, a solid electrolytic capacitor is disclosed that comprises an anode that includes a first anode component and a second anode component that are electrically connected by a refractory metal paste. A dielectric layer overlies at least a portion of the first anode component and the second anode component. A cathode overlies at least a portion of the dielectric layer, wherein the cathode includes a solid electrolyte.

In accordance with another embodiment of the present invention, an anode for use in an electrolytic capacitor is disclosed. The anode is formed from a first individually compacted anode component and a second individually compacted anode component that are electrically connected by a refractory metal paste, wherein the first anode component and the second anode component include tantalum, niobium, or an electrically conductive oxide thereof. In accordance with yet another embodiment of the present invention, a method for forming an anode of an electrolytic capacitor is disclosed that comprises pressing a first powder to form a first anode component; pressing a second powder to form a second anode component; applying a refractory metal paste to the first anode component, the second anode component, or both; positioning the first anode component adjacent to the second anode component; and sintering the refractory metal paste to electrically connect the first anode component to the second anode component.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
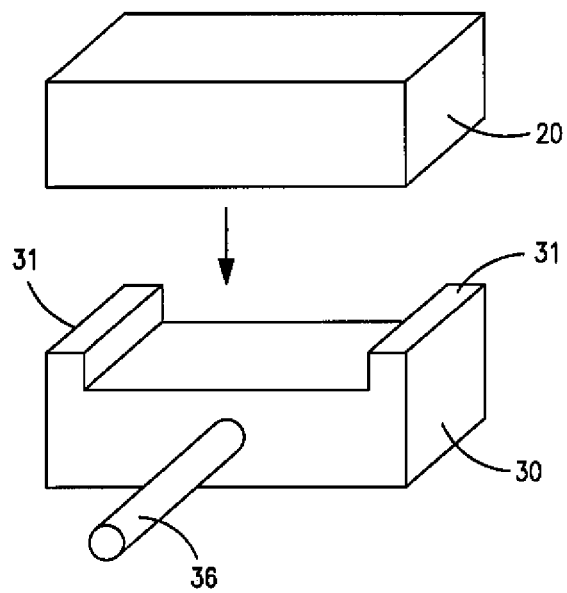
FIG. 1 is a perspective view of one embodiment of two separate anode components that may be electrically connected in accordance with the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor containing a capacitor element that includes an anode, dielectric layer, and solid electrolyte. The anode is formed from a plurality (e.g., two or more) of separate components, which allows the properties of each component (e.g., density, quality, etc.) to be more readily controlled during manufacturing. The components are electrically connected using a refractory metal paste (e.g., tantalum paste) that sinter bonds to the components to form a strong and reliable connection. The ability to reliably bond together separate components enables the use of a wide degree of possible cross-sectional profiles for each individual component. For example, the components may posses a relatively complex profile that contains one or more indentations and/or projections for increasing surface area. Despite the complex profile, the components may be readily connected to each other in accordance with the present invention to form the anode. In this regard, various embodiments of the present invention will now be described in more detail.

The composition used to form the anode components may include a valve metal composition having a high specific charge, such as about 40,000 µF*V/g or more, in some embodiments about 50,000 µF*V/g or more, in some embodiments about 60,000 µF*V/g or more, and in some embodiments, from about 70,000 to about 700,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode components. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode components, other ingredients may be added to the electrically conductive particles. For example, the electrically conductive particles may be optionally mixed with a binder and/or lubricant to ensure that the particles adequately adhere to each other when pressed to form the anode component. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be optionally compacted around an anode lead (e.g., tantalum wire) so that the lead becomes embedded within an anode component. The anode lead may be in the form of a ribbon, wire, sheet, etc., and may be formed from a valve metal compound, such as tantalum, niobium, niobium oxide, etc. It should be further appreciated that the anode lead may alternatively be attached (e.g., welded) to the anode component subsequent to pressing and/or sintering of the anode body.

If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

One benefit of the present invention is that individual anode components may be formed separately and subsequently connected. This enhances the ability to form components with complex cross-sectional profiles. That is, one component may be formed (e.g., pressed) to have a first profile and another component may be formed to have a second profile. When connected together, the cross-sectional profiles of each component combine together to form the desired profile of the anode part. Thus, rather than forming a single anode part with the complex cross-sectional profile, the process is divided into multiple steps to ease the manufacturing difficulty in achieving such a profile. The cross-sectional profile of the components may vary in any manner desired. For example, a component may have a cross-sectional textured profile that is curved, sinusoidal, rectangular, U-shaped, V-shaped, triangular, etc. Such textured profiles generally contain one or more indentations and projections (or "flutes"). Various examples of "fluted" anodes containing indentations and projections are described, for instance, in U.S. Pat. No. 5,949,639 to Maeda, et al. and U.S. Pat. No. 7,116,548 to Satterfield, et al., all of which are incorporated herein in their entirety by reference thereto for all purposes.

Regardless of their cross-sectional profiles, a refractory metal paste is employed to electrically connect the individual anode components. The paste generally contains particles of a relatively small size, such as having an average size of from about 0.01 to about 20 micrometers, in some embodiments from about 0.1 to about 15 micrometers, and in some embodiments, from about 1 to about 10 micrometers. Due to in part to the relatively small size of the particles, the paste may have a relatively low viscosity, allowing it to be readily handled and applied to an anode lead and/or anode component during manufacture of the capacitor. The viscosity may, for instance, range from about 5 to about 200 Pascal-seconds, in some embodiments from about 10 to about 150 Pascal-seconds, and in some embodiments, from about 20 to about 100 Pascal-seconds, as measured with a Brookfield DV-1 viscometer using Spindle No. 18 operating at 12 rpm and 25° C. If desired, thickeners or other viscosity modifiers may be employed in the paste to increase or decrease viscosity. Further, the thickness of the applied paste may also be relatively thin and still achieve the desired binding of the lead to the anode component. For example, the thickness of the paste may be from about 0.01 to about 50 micrometers, in some embodiments from about 0.5 to about 30 micrometers, and in some embodiments, from about 1 to about 25 micrometers.

The particles used in the paste are formed from a composition that includes a refractory metal, such as tungsten, molybdenum, niobium, tantalum, rhenium, osmium, iridium, ruthenium, hafnium, zirconium, vanadium, chromium, as well as electrically conductive alloys, oxides, and nitrides of these metals. Preferably, the composition is the same or substantially similar in nature to the material used to form the anode component. In one particular embodiment, for example, tantalum metal particles are employed for bonding to a tantalum anode components.

To form the paste, the particles may be initially dispersed in a solvent. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. One particular benefit of the present invention is that aqueous solvents (e.g., water) may be employed. In fact, water may constitute about 20 wt. % or more, in some embodiments, about 50 wt. % or more, and in some embodiments, about 75 wt. % to 100 wt. % of the solvent(s) used in the paste.

The total concentration of solvent(s) employed in the paste may vary, but is typically from about 1 wt. % to about 40 wt. %, in some embodiments from about 5 wt. % to about 30 wt. %, and in some embodiments, from about 10 wt. % to about 20 wt. % of the paste. Of course, the specific amount of solvent(s) employed depends in part on the desired solids content and/or viscosity of the paste. For example, the solids content may range from about 40% to about 98% by weight, more particularly, between about 50% to about 96% by weight, and even more particularly, between about 60% to about 95% by weight. By varying the solids content of the paste, the presence of the refractory metal particles may be controlled. For example, to form a paste with a higher level of particles, the formulation may be provided with a relatively high solids content so that a greater percentage of the particles are incorporated into the paste.

The paste may also employ an adhesive to help retain the particles in an undisrupted position and/or assist in the adherence of the paste to the desired surface. Although any adhesive may be employed, organic adhesives are particularly suitable for use in the present invention. Examples of such adhesives may include, for instance, epoxy compounds (e.g., two-component UHU epoxy adhesive); poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); silicon polymers, such as poly(methyl siloxane), poly(methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates.

In addition to adhesives, the paste may also include other ingredients. For example, one or more dispersants may be employed in the paste to reduce the surface tension of the suspension. One class of suitable dispersants includes anionic compounds having acid groups or salts thereof. Such compounds, for example, may contain at least one ethylenically unsaturated acid containing monomer and optionally at least one ethylenically unsaturated nonionic monomer. Suitable acid monomers include monomers having carboxylic acid groups, such as acrylic acid, methacrylic acid, itaconic acid, fumaric acid, crotonic acid, maleic acid, monomethyl itaconate, monomethyl fumarate, and monobutyl fumarate; anhydrides, such as maleic anhydride and itaconic anhydride; or combinations thereof. Suitable ethylenically unsaturated monomers include alkyl esters of (meth)acrylic acid, such as ethyl acrylate, butyl acrylate, and methyl methacrylate; hydroxy esters of (meth)acrylic acid, such as hydroxyethyl methacrylate, hydroxyethyl acrylate, hydroxypropyl acrylate, and hydroxypropyl methacrylate; aromatic monomers, such as styrene and $\alpha$-methyl styrene; and alkenes, such as di-isobutylene.

A wetting agent, or surfactant, may also be employed in the paste to facilitate the formation of homogeneously uniform pastes having desirable spreadability. Suitable surfactants may include cationic surfactants, nonionic surfactants, anionic surfactants, amphoteric surfactants, and so forth. Nonionic surfactants, for instance, may have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. Particularly suitable nonionic surfactants may include the polyethylene oxide condensates of one mole of alkyl phenol containing from about 8 to 18 carbon atoms in a straight- or branched-chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol.

Plasticizers may also be employed in the paste to enhance the film-forming characteristics of the paste. Plasticizers are well-known and a wide range of plasticizers can be employed. Examples of typical plasticizers include mineral oil; glycols, such as propylene glycol; phthalic esters, such as dioctyl phthalate and benzyl butyl phthalate; and long-chain aliphatic acids, such as oleic acid and stearic acid; and mixtures thereof.

The concentration of each component of the paste may vary depending on the amount of particles desired, the wet pick-up of the application method utilized, etc. For example, the amount of the particles within the paste generally ranges from about 20 wt. % to about 90 wt. %, in some embodiments from about 40 wt. % to about 85 wt. %, and in some embodiments, from about 60 wt. % to about 80 wt. %. Adhesive(s) may also constitute from about 0.01 wt. % to about 20 wt. %, in some embodiments from about 0.1 wt. % to about 15 wt. %, and in some embodiments, from about 1 wt. % to about 10 wt. % of the paste. Other components, such as dispersants, surfactants, plasticizers, etc., may each constitute from about 0.001 wt. % to about 10 wt. %, in some embodiments from about 0.01 wt. % to about 5 wt. %, and in some embodiments from about 0.1 wt. % to about 3 wt. % of the paste.

Any of a variety of techniques may generally be employed to apply the refractory metal paste to an anode component, such as heat treating, thermal sintering, sputtering, screen-printing, dipping, electrophoretic coating, electron beam deposition, spraying, roller pressing, brushing, doctor blade casting, vacuum deposition, coating, etc. Once applied, the refractory metal paste may be optionally heated to remove any adhesive/lubricant present. Regardless, the paste is sintered so that the particles form a bond with the anode components. Sintering of the paste in accordance with the present invention may occur before and/or after the anode components are sintered. In one particular embodiment, the refractory metal paste is co-sintered with the anode components. The temperature at which the paste is sintered may range, for example, from about 1000° C. to about 2500° C., in some embodiments from about 1000° C. to about 2000° C., and in some embodiments from about 1200° C. to about 1800° C. Sintering may occur at any desired pressure. In certain embodiments, sintering may occur at a relatively low pressure, such as less than about 200 millitorr, in some embodiments less than about 100 millitorr, and in some embodiments, less than about 50 millitorr. The total time of sintering may also range from about 10 minutes to about 1 hour.

Figure 2:
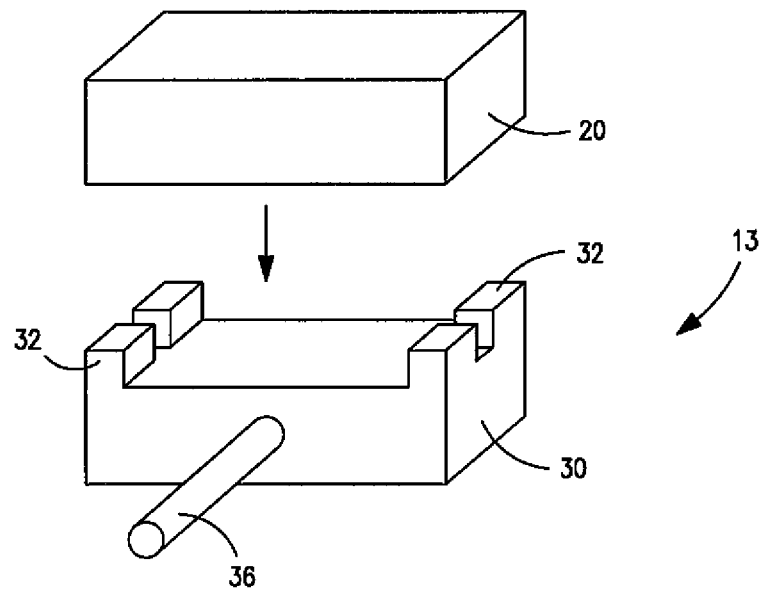
FIG. 2 is a perspective view of another embodiment of two separate anode components that may be electrically connected in accordance with the present invention.
Figure 3:
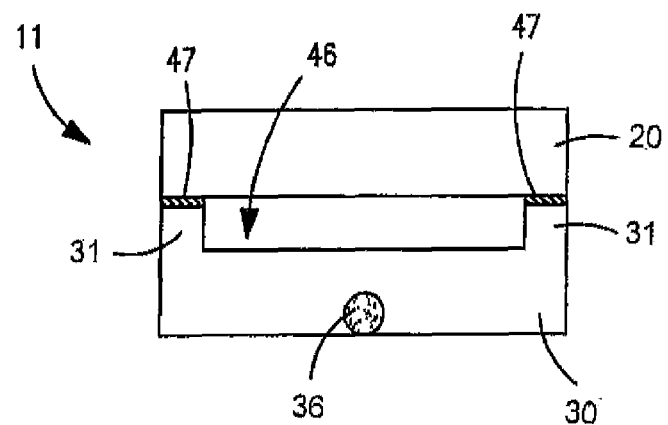
FIG. 3 is a cross-sectional view of the anode components of FIG. 1 after connection.

The manner in which the paste is applied to the component(s) depends in part on the particular shape of the components. Referring to FIGS. 1 and 3, for example, one embodiment is shown in which an anode 11 is formed from a first component 20 and a second component 30. The first component 20 has a generally rectangular shape and may be mounted over the second component 30 as indicated by the directional arrow in FIG. 1. The second component 30 likewise has a generally rectangular shape and has an upper surface from which extends opposing projections 31. A lead wire 36 may also be embedded within and extend from the body of the second component 30. In this particular embodiment, a refractory metal paste 47 is located between the ends of the first component 20 and respective projections 31 of the second component 30 for electrically connecting the components together. Due to the use of projections during connection, the resulting anode 11 defines an interior space 46. The space 46 may enhance the ability of a solid electrolyte to impregnate the pores and surface of the components 20 and 30, thereby improving the overall electrical properties. The ability to improve impregnation of the solid electrolyte may be even further enhanced by increasing the surface area of the projections. Referring to FIG. 2, for example, an anode 13 is shown that is formed from the first and second components 20 and 30 described above, except that projections 32 are employed at or near the corners of the second component 30. The projections 32 are discontinuous along the width and length of the component, and are thus able to increase surface area and enhance the ability to impregnate the anode 13.

Figure 4:
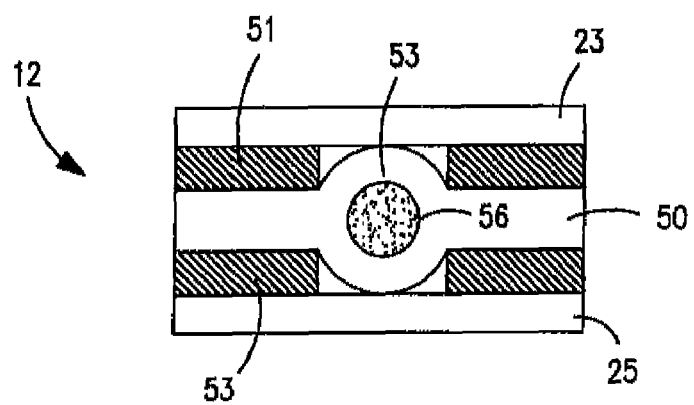
FIG. 4 is a cross-sectional view of another embodiment of the anode of the present invention formed from two separate components.

While the embodiments referenced above employ two (2) separate components, it should be understood that the present invention is by no means limited to any particular number of separate anode components. Referring to FIG. 4, for example, an anode 12 is shown that includes an inner anode component 50 that is positioned between a first outer component 23 and a second outer component 25. A refractory metal paste 51 is employed to electrically connect the inner component 50 to the first outer component 23, and a refractory metal paste 53 is employed to electrically connect the inner component 50 to the second outer component 25. In FIG. 4, the inner component 50 contains projections 53 for contacting the outer components. In this particular embodiment, the projections 53 have a generally circular cross-sectional profile to better accommodate an anode lead wire 56.

Figure 6:
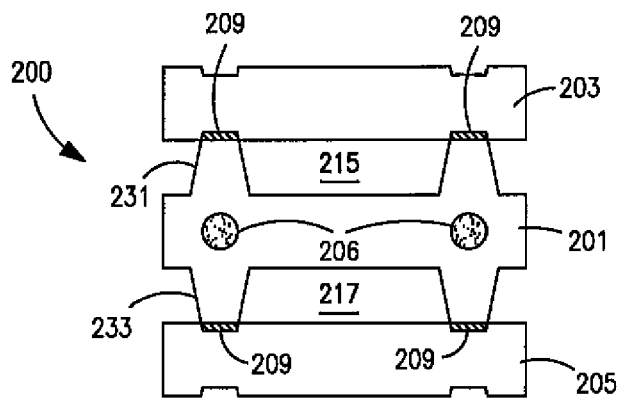
Figure 7:
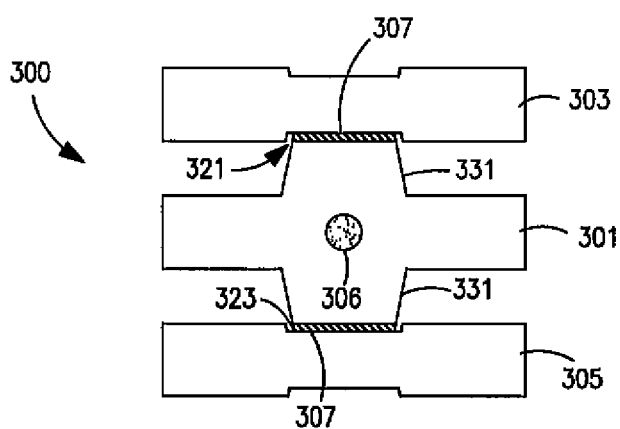

The projections may also possess other shapes and/or sizes. For example, FIG. 7 illustrates an embodiment in which an anode 300 contains an inner component 301 containing trapezoidal-shaped projections 301. Such a shape may enhance the degree of surface contact between the inner component 301, paste 307, and outer components 303 and 305. If desired, the outer components 303 and 305 may also contain recessed regions 321 and 323, respectively, that are complementary to and receive the shape of the projections. As shown, the inner component 301 of FIG. 7 also contains a single anode lead wire 306. In certain embodiments, however, multiple anode lead wires may be employed. Referring to FIG. 6, for example, an anode 200 is shown that contains an inner component 201 and two separate anode lead wires 206. The inner component 201 contains projections 231 and 233 that are electrically connected to outer components 203 and 205, respectively, via a paste 209. As a result of this construction, the anode 200 defines two (2) separate interior spaces 215 and 217 for increasing the ability to impregnate the pores and surface of the components.

Figure 5:
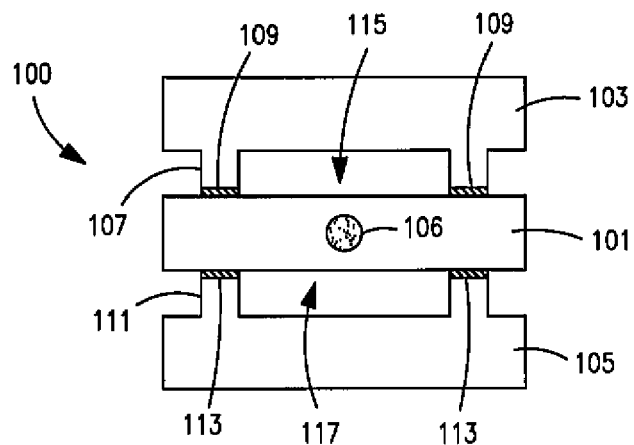
FIGS. 5-7 are cross-sectional views of still other embodiments of the anode of the present invention, which are formed from three separate components.

FIG. 5 illustrates an additional embodiment of a three-component anode 100 that includes an inner component 101 that contains an anode lead wire 106 and is positioned between a first outer component 103 and a second outer component 105. Contrary to the embodiments of FIGS. 6 and 7, the inner component in this embodiment is generally rectangular in nature and the outer components 103 and 105 contain projections 107 and 111, respectively. The projections 107 and 111 are electrically connected to the inner component 101 by refractory metal pastes 109 and 113, respectively.

Figure 8:
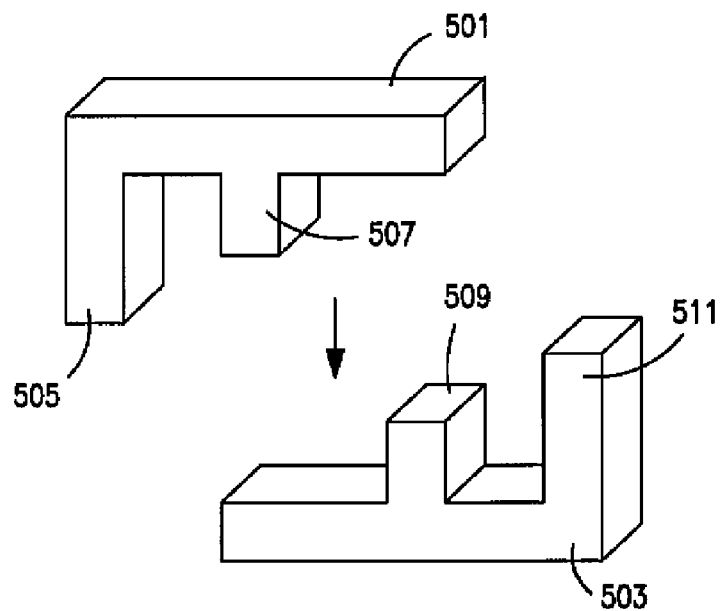
FIG. 8 is a perspective view of another embodiment of two separate anode components that may be electrically connected in accordance with the present invention.
Figure 9:
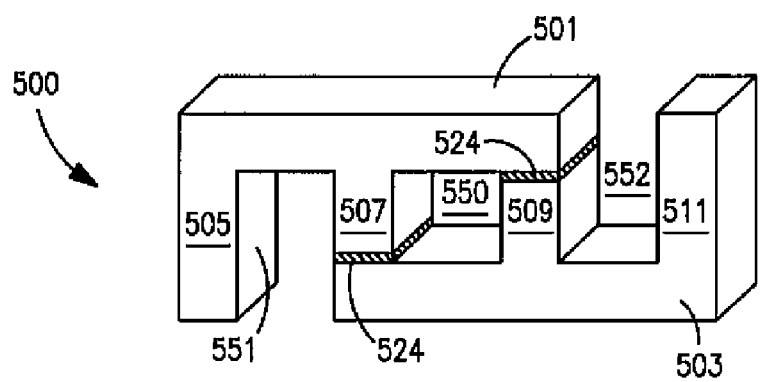
FIG. 9 is a perspective view of the anode components of FIG. 8 after connection.

In the embodiments described above, an anode lead is embedded within one or more of the anode components for subsequent connection to an anode termination. It should be understood, however, that the anode lead need not be embedded within the component(s). For example, the anode lead may be electrically connected to one or more components using the refractory metal paste. Referring to FIGS. 8-9, for instance, one embodiment of an anode 500 is shown that is formed from a first component 501 and a second component 503. The first component contains projections 505 and 507, and the second component contains projections 509 and 511. As shown by the directional arrow in FIG. 8, the components may be connected by contacting the projection 507 of the first component with a surface of the second component 503 and the projection 509 with a surface of the first component 501. A refractory metal paste 524 is employed to connect the components at the specified locations. When connected in this manner, various interior spaces 550, 551, and 552 are formed for improving impregnation of the solid electrolyte. Further, although not expressly shown, an anode lead may be subsequently inserted to one of the spaces (e.g., space 550) and connected to the components using a refractory metal paste (not shown). Upon sintering, a strong bond may be formed between the particles of the refractory metal paste and the metal of both the anode component(s) and the anode lead.

Once the anode is formed, it may be anodized so that a dielectric layer is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gailic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The anodized part may be subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer et al., which is incorporated herein in its entirety by reference thereto for all purposes. Alternatively, a conductive polymer coating may be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H.C. Starck. CLEVIOS C is a commercially available catalyst for CLEVIOS M, which is 3,4-ethylene dioxythiophene, a PEDT monomer also sold by H.C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. Techniques, such as described above, may be described in more detail in U.S. Publication No. 2008/232037 to Biler.

In addition, the catalyst (e.g., CLEVIOS C) may also be mixed with the material(s) used to form the optional protective coating (e.g., resinous materials). In such instances, the anode part may then be dipped into a solution containing the monomer (CLEVIOS M). As a result, the monomer can contact the catalyst within and/or on the surface of the protective coating and react therewith to form the conductive polymer coating. Techniques, such as described above, may be described in more detail in U.S. Pat. No. 7,460,358 to Biler. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

Once applied, the solid electrolyte may be healed. Healing may occur after each application of a solid electrolyte layer or may occur after the application of the entire coating. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Figure 10:
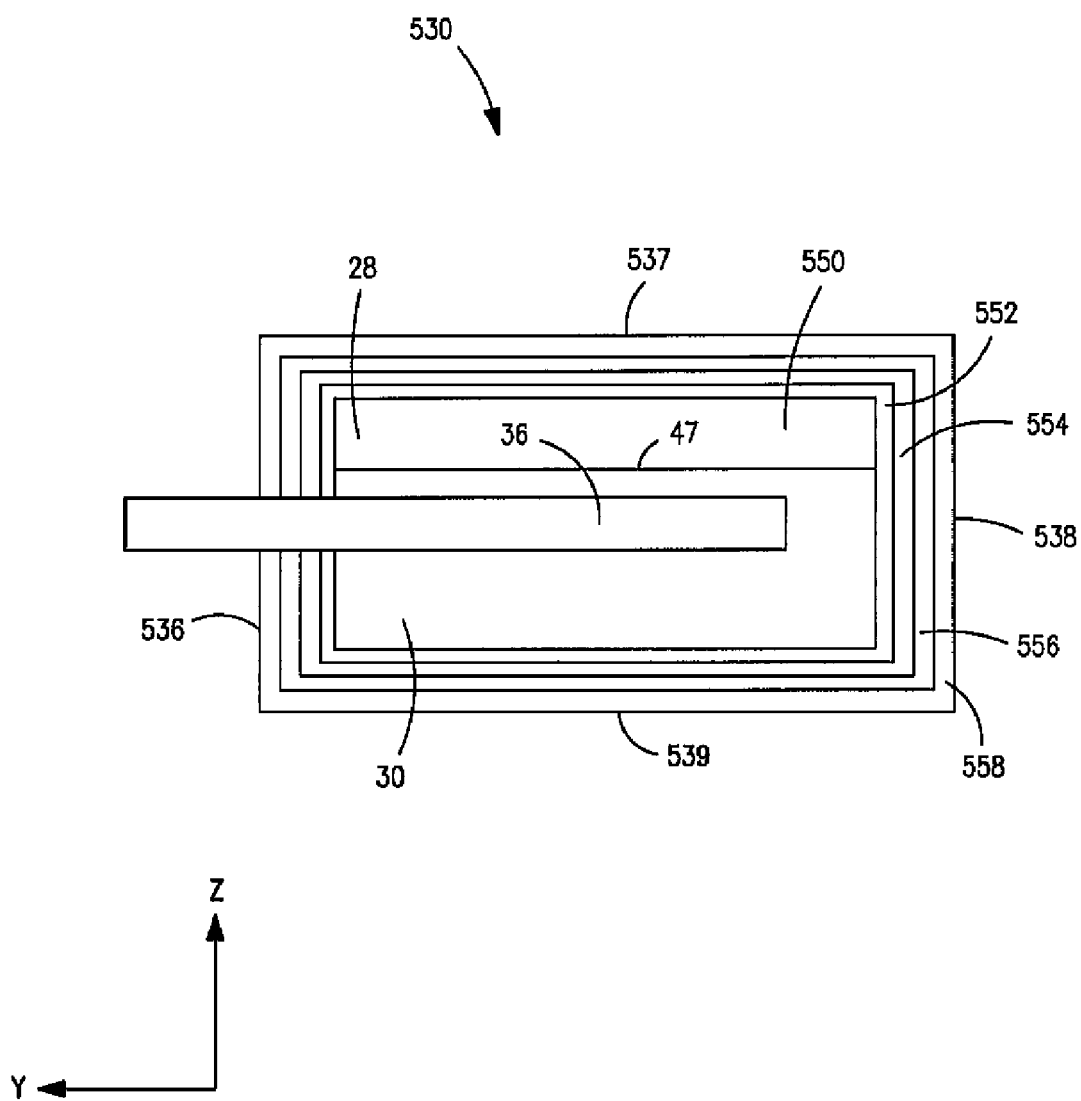
FIG. 10 is a cross-sectional view of one embodiment of a solid electrolytic capacitor of the present invention.

The resulting capacitor element may then be terminated using techniques known in the art. Referring to FIG. 10, for example, one embodiment of a capacitor element 530 is shown that has a front surface 536, rear surface 538, top and bottom surfaces 537 and 539, respectively, and side surfaces 532 (only one of which is illustrated). In this embodiment, the capacitor element 530 contains an anode 550 formed from two (2) anode components 20 and 30 connected together with a paste 47, such as shown in FIG. 1 and described above. An anode wire 36 extends from the front surface 536 of the component 30 in a longitudinal direction ("y" direction). The capacitor element 530 also contains a dielectric layer 552 overlying and positioned between the anode components 20 and 30, a solid electrolyte layer 554 overlying the dielectric layer 52, a graphite layer 556 overlying the solid electrolyte layer 554, and a silver layer 558 overlying the graphite layer 556. Of course, it should be understood that such layers may be applied to any surface of the capacitor, and need not be applied in the manner illustrated.

Figure 11:
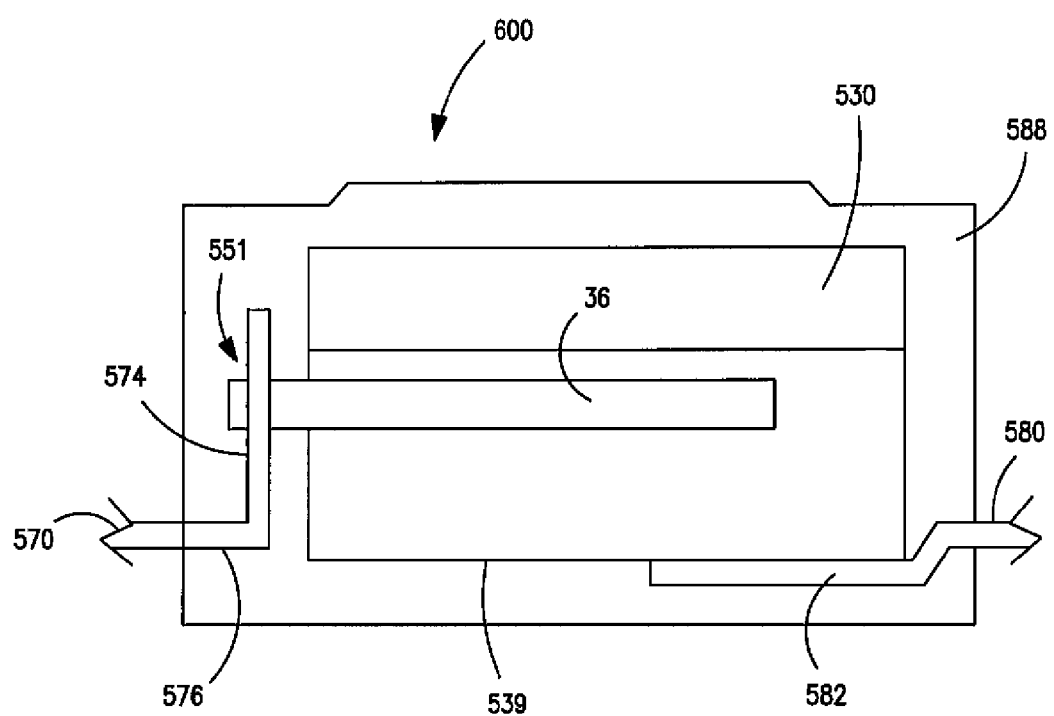
FIG. 11 is a cross-sectional view of a capacitor formed in accordance with one embodiment of the present invention.

Upon formation of the capacitor element 530, anode and cathode termination may be electrically connected to the anode wire 36 and the solid electrolyte layer 554 (via the graphite and silver layers), respectively. The specific configuration of the terminations may vary as is well known in the art. Referring to FIG. 11, for example, one embodiment is shown that includes an anode termination 570 and a cathode termination 580. In this particular embodiment, the cathode termination 580 contains a portion 582 in electrical contact with the lower surface 539 of the capacitor element 530. To attach the capacitor element 530 to the cathode termination 580, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The anode termination 570 contains a first portion 576 positioned substantially perpendicular to a second portion 574. The second portion 574 contains a region 551 that carries the anode wire 36. If desired, the region 551 may possess a "U-shape" for further enhancing surface contact and mechanical stability of the wire 36. The anode wire 36 may then be welded to the region 551 with a laser. Once the capacitor element is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring again to FIG. 11, for example, one particular embodiment of such an encapsulating case for a capacitor 600 is shown as element 588. The encapsulating case 588 provides additional structural and thermal protection for the capacitor 600. After encapsulation, exposed portions of the respective anode and cathode terminations may be aged, screened, and trimmed. If desired, the exposed portions may be optionally bent twice along the outside of the casing 588 (e.g., at an approximately 90° angle).

The present invention may be better understood by reference to the following examples.

Test Procedures

Capacitance:

Capacitance was measured using a Keithley 3330 Precision LCZ meter with Kelvin Leads with 2 volts bias and 1 volt signal. The operating frequency was 120 Hz and the temperature was 23° C.±2° C. When determining "wet" capacitance, a 20% aqueous solution of sulfuric acid was employed as the working electrolyte.

Example 1

200,000 µFV/g tantalum powder was pressed into two L-shaped pellets, one of which contained an anode wire. The pellets were glued together using the above-described tantalum paste and then sintered to form a porous electrode body. The pellets were anodized in a phosphoric acid electrolyte in water and subsequently shell-formed in a water/ethylene glycol electrolyte to form the dielectric layer. A manganese dioxide solid electrolyte was formed by the pyrolytic decomposition of manganous nitrate ($Mn(NO_3)_2$). The pellets were then coated with a graphite coating and a silver coating. The finished parts were completed by conventional assembly technology and measured. The wet capacitance was 780.1 µF and the final capacitance value was 984.0 µF.

Example 2

A part was formed as described in Example 1, except that anode wire was pressed into each of the pellets. The wet capacitance was 786.3 µF and the final capacitance value was 1003.6 µF.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising a capacitor element, the capacitor element comprising:
    an anode that includes a first anode component and a second anode component, wherein the first anode component, the second anode component, or both, have a cross-sectional profile that includes at least one projection, and wherein a refractory metal paste is disposed on the projection and connects the first anode component and the second anode component so that an interior space is defined therebetween;
    an anode lead wire that is embedded within the first anode component, the second anode component, or both;
    a dielectric layer overlying at least a portion of the first anode component and the second anode component; and
    a cathode overlying at least a portion of the dielectric layer, wherein the cathode includes a solid electrolyte.

2. The solid electrolytic capacitor of claim 1, wherein the first anode component and the second anode component include tantalum, niobium, or an electrically conductive oxide thereof.

3. The solid electrolytic capacitor of claim 1, wherein the first anode component and the second anode component are individually compacted prior to being connected by the refractory metal paste.

4. The solid electrolytic capacitor of claim 1, wherein the projection is discontinuous along a length and width of the first component, the second component, or both.

5. The solid electrolytic capacitor of claim 1, wherein the first anode component, the second anode component, or both, have a cross-sectional profile that includes two or more projections.

6. The solid electrolytic capacitor of claim 4, wherein at least two of the projections are located at opposing ends of the first anode component, the second anode component, or both.

7. The solid electrolytic capacitor of claim 1, wherein the anode further comprises a third anode component, wherein the first anode component is positioned between the second anode component and the third anode component.

8. The solid electrolytic capacitor of claim 7, wherein the first anode component is connected to the third anode component by a refractory metal paste.

9. The solid electrolytic capacitor of claim 7, wherein the first anode component contains one or more projections.

10. The solid electrolytic capacitor of claim 7, wherein the second anode component, the third anode component, or both contain one or more projections.

11. The solid electrolytic capacitor of claim 1, wherein the paste contains a plurality of particles, wherein the particles are sinter bonded to both the first anode component and the second anode component.

12. The solid electrolytic capacitor of claim 11, wherein the particles are formed from tantalum.

13. The solid electrolytic capacitor of claim 11, wherein the particles have an average size of from about 0.1 to about 20 micrometers, and wherein the paste has a thickness of from about 0.01 to about 50 micrometers.

14. The solid electrolytic capacitor of claim 1, wherein the solid electrolyte includes manganese dioxide or a conductive polymer.

15. The solid electrolytic capacitor of claim 1, further comprising:
    an anode termination that is electrically connected to the anode lead;
    a cathode termination that is electrically connected to the cathode; and
    a case that encapsulates the capacitor element and leaves exposed at least a portion of the anode termination and the cathode termination.

16. A solid electrolytic capacitor comprising a capacitor element, the capacitor element comprising:
    an anode that includes a first anode component and a second anode component, wherein the first anode component, the second anode component, or both, have a cross-sectional profile that includes at least one projection, and wherein a refractory metal paste is disposed on the projection and connects the first anode component and the second anode component so that an interior space is defined therebetween;
    an anode lead that is electrically connected to the first anode component, the second anode component, or both;
    a dielectric layer overlying at least a portion of the first anode component and the second anode component;
    a cathode overlying at least a portion of the dielectric layer, wherein the cathode includes a solid electrolyte;
    an anode termination that is electrically connected to the anode lead;
    a cathode termination that is electrically connected to the cathode; and
    a case that encapsulates the capacitor element and leaves exposed at least a portion of the anode termination and the cathode termination, wherein the case encloses the entire capacitor element so that the capacitor has an upper surface and opposing lower surface, wherein at least a portion of the anode termination and at least a portion the cathode termination remain exposed by the case at the lower surface of the capacitor.

17. The solid electrolytic capacitor of claim 16, wherein the first anode component and the second anode component include tantalum, niobium, or an electrically conductive oxide thereof.

18. The solid electrolytic capacitor of claim 16, wherein the first anode component and the second anode component are individually compacted prior to being connected by the refractory metal paste.

19. The solid electrolytic capacitor of claim 16, wherein the projection is discontinuous along a length and width of the first component, the second component, or both.

20. The solid electrolytic capacitor of claim 16, wherein the first anode component, the second anode component, or both, have a cross-sectional profile that includes two or more projections.

21. The solid electrolytic capacitor of claim 20, wherein at least two of the projections are located at opposing ends of the first anode component, the second anode component, or both.

22. The solid electrolytic capacitor of claim 16, wherein the anode further comprises a third anode component, wherein the first anode component is positioned between the second anode component and the third anode component.

23. The solid electrolytic capacitor of claim 22, wherein the first anode component is connected to the third anode component by a refractory metal paste.

24. The solid electrolytic capacitor of claim 22, wherein the first anode component contains one or more projections.

25. The solid electrolytic capacitor of claim 22, wherein the second anode component, the third anode component, or both contain one or more projections.

26. The solid electrolytic capacitor of claim 16, wherein the paste contains a plurality of particles, wherein the particles are sinter bonded to both the first anode component and the second anode component.

27. The solid electrolytic capacitor of claim 26, wherein the particles have an average size of from about 0.1 to about 20 micrometers, and wherein the paste has a thickness of from about 0.01 to about 50 micrometers.

28. The solid electrolytic capacitor of claim 26, wherein the particles are formed from tantalum.

29. The solid electrolytic capacitor of claim 16, wherein the solid electrolyte includes manganese dioxide or a conductive polymer.

\* \* \* \* \*

UNITED STATES PATENT AND TRADEMARK OFFICE
CERTIFICATE OF CORRECTION

PATENT NO. : 8,279,583 B2  
APPLICATION NO. : 12/474303  
DATED : October 2, 2012  
INVENTOR(S) : Stanislav Zednicek, Peter Jacisko and Tomas Karnik Page 1 of 1

It is certified that error appears in the above-identified patent and that said Letters Patent is hereby corrected as shown below:

Title Page, Item (56)
Under Foreign Patent Documents, "JP 1061537 A2" should read --EP 1061537 A2--

Signed and Sealed this
Fourth Day of December, 2012

David J. Kappos
*Director of the United States Patent and Trademark Office*